Figure 1:
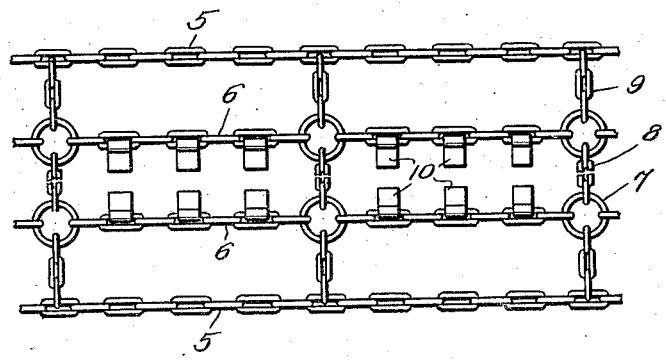

March 8, 1927.

W. H. COAD 1,620,076

ANTISKID CHAIN FOR TIRES

Filed March 5, 1926

Inventor
W. H. Coad,
By Clarence A. O'Brien
Attorney

Patented Mar. 8, 1927.

1,620,076

UNITED STATES PATENT OFFICE.

WILLIAM H. COAD, OF NOWATA, OKLAHOMA.

ANTISKID CHAIN FOR TIRES.

Application filed March 5, 1926. Serial No. 92,553.

This invention relates to an anti-skid chain for automobile tires and has for its primary object to provide a skid chain that is provided with means that will automatically engage the tread of the tire should the car attempt to skid laterally for forming a chuck action between the tire and the ground in order to prevent such lateral skidding.

A further object of the invention resides in the provision of a skid chain of this character that may be manufactured and marketed at a cost which is slightly greater than the simplest of the skid chains now used.

Other objects will become apparent as the nature of the invention will be better understood, the same comprising the novel form, combination and arrangement of parts hereinafter more fully described and shown in the accompanying drawing and claimed.

In the drawing wherein like reference characters indicate corresponding parts throughout the several views:—

Figure 2:
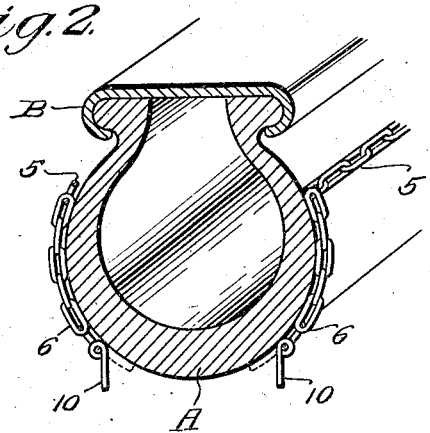
Figure 3:
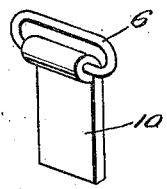

Figure 1 is a fragmentary plan view of a chain constructed in accordance with the present invention, Fig. 2 is a view disclosing a vehicle tire partly in cross section and partly in fragmentary perspective upon which is disposed a chain constructed in accordance with the present invention, and Fig. 3 is a perspective view of one of the links of the chain to which is pivotally associated a plate that when the chain is applied to the wheel will hang alongside of the tire tread in scraping engagement with the ground and that will be drawn beneath the tire should the vehicle attempt to skid laterally.

Now having particular reference to the present drawing, my novel chain constitutes the provision of a pair of chain lengths 5—5 formed from links of any desired construction, said chain lengths adapted to engage upon the opposite side walls of a tire A directly adjacent the carrying rim B for said tire. Obviously, the opposite ends of these chain sections are to be interconnected to any desirable hook members, said hook members not being shown mainly for the reason that they are not of the essence of the present invention.

The chain further includes the provision of a pair of spaced central chain lengths 6—6 that will engage along the side walls of the tire at opposite sides of the ground engaging tread portion thereof as is clearly shown in Fig. 2. The center chain lengths 6—6 include spaced rings 7 in order that said central lengths may be interconnected through reason of links 8 and also be connected to the outer chain lengths 5—5 through reason of other links 9, said rings and links 7, 8 and 9 respectively further providing means for preventing the longitudinal skidding of the tire and for affording traction for the tire on slippery or muddy roads.

Pivotally connected to every other link comprising the central chain lengths 6—6, are metallic plates 10 that are of a length to engage slightly beneath the tread of the tire A should the same be raised off of the ground, but that will swing beneath the opposite sides of the tire tread during the running of the machine, thus effecting a chuck between the tire and the road for absolutely preventing lateral skidding of the tire.

Said plates are in the form of sheet metal strips that are extended at one end through the links comprising the chain lengths 6—6 as more clearly shown in Fig. 3, after which said ends are curled around the links for providing a pivotal connection therebetween.

It will thus be seen that I have provided a highly novel, simple and efficient form of anti-skid chain for vehicle wheels that is well adapted for the purpose heretofore designated.

Having thus described my invention, what I claim as new and desire to secure by Letters Patent is:—

1. In an anti-skid device for tires, a pair of chains extending circumferentially around the tire and arranged on opposite sides of the tread portion thereof, and metallic plates pivotally connected to the links of each chain at predetermined points, said plates adapted to swing inwardly and engage beneath the tread of the tire and the ground to prevent lateral skidding.

2. In an anti-skid device for tires, a pair of side chains extending circumferentially around the tire adjacent the respective bead portions thereof, an additional pair of circumferentially extending chains disposed on opposite sides of the tread portion of the tire, links interconnecting the chains together and plates pivotally connected to predetermined links of the last mentioned pair of circumferentially extending chains, said plates adapted to engage beneath the tread of the tire to provide a chuck between the tread of the tire and the road whereby to prevent lateral skidding.

In testimony whereof I affix my signature.

WILLIAM H. COAD.